April 15, 1947. C. C. WHITTAKER 2,419,045
SPRING-DRIVEN ROTATABLE SURGICAL CUTTER WITH HAND
PRESSURE SPEED CONTROL
Filed Jan. 4 1947
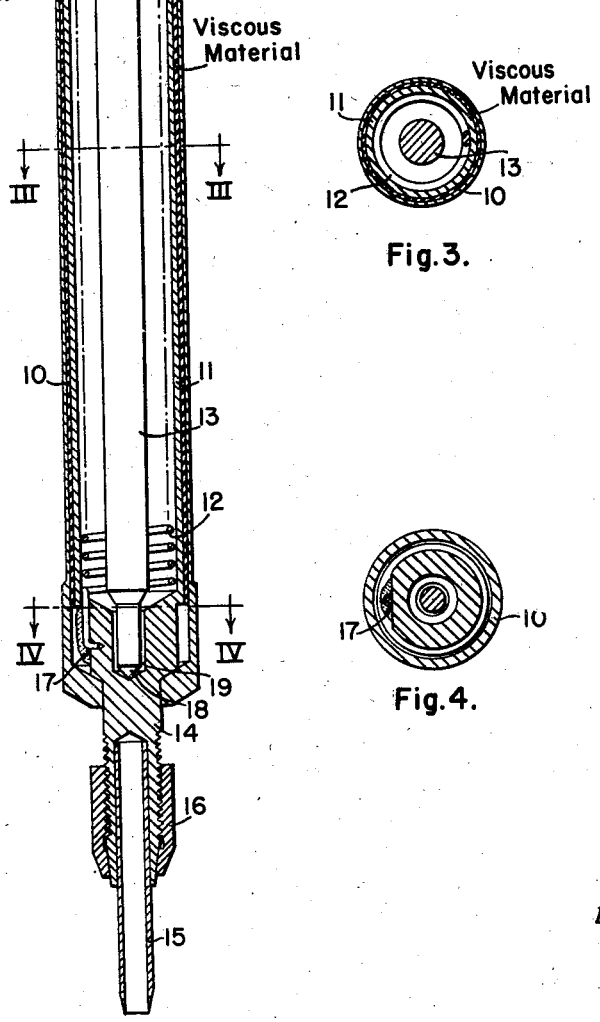
INVENTOR.
Charles C. Whittaker.
BY
ATTORNEY Patented Apr. 15, 1947

2,419,045

UNITED STATES PATENT OFFICE 2,419,045

SPRING-DRIVEN ROTATABLE SURGICAL CUTTER WITH HAND PRESSURE SPEED CONTROL

Charles C. Whittaker, Pittsburgh, Pa.

Application January 4, 1947, Serial No. 720,151

7 Claims. (Cl. 128—305)

1

My invention relates, generally, to surgical instruments and, more particularly, to instruments having a rotatable tool for performing certain operations on the eye.

An object of my invention is to provide an instrument of the foregoing type which is unemcumbered by flexible shafts, electric cords, pushbutton releases, etc.

Another object of my invention is to provide for easily controlling the speed of such an instrument from zero to maximum.

A further object of my invention is to provide a surgical instrument which is convenient for the operator to handle when performing an operation.

Other objects of my invention will be fully described hereinafter or will be apparent to those skilled in the art.

In accordance with one embodiment of my invention, the rotatable tool of a surgical instrument is driven by a spring contained within the instrument, thereby obviating the necessity of external connections. The instrument is so constructed that it may be held in the operable position much the same as a pencil is normally held and the speed of the rotating tool is controlled by changes in pressure between the operator's thumb and fingers holding the instrument.

For a better understanding of the nature and objects of my invention, reference may be had to the following detailed description, taken in conjunction with the accompanying drawing, in which:

Figure 1 is an enlarged view, in longitudinal section, of a surgical instrument embodying the principal features of my invention;

Figs. 2, 3 and 4 are views, in transverse section, taken along the lines II—II, III—III and IV—IV, respectively, and Fig. 5 is a view, in elevation, of the instrument.

Referring to the drawing, and particularly to Fig. 1, the structure shown therein comprises a cylindrical casing 10 inside of which are disposed a cylindrical tube 11, a helical spring 12 and a spindle 13. The tube 11 is rotatably mounted in the casing 10 and has a solid portion 14 which extends through an opening in the lower end of the casing. A suitable cutting tool 15 may be secured in a chuck 16 which is provided on the lower end of the tube 11.

The tube 11, and hence the tool 15, are driven by energy stored in the spring 12, the upper end of which frictionally engages the spindle 13. The lower end of the spring may be attached to the solid portion 14 of tube 11 at 17 by a mechanical

2 and soldered connection. A pivot bearing 18 is provided for the lower end of the spindle 13 which is disposed in a well 19 in the solid portion 14 of the tube 11.

The upper end of the spindle 13 extends through a bearing cap 21 which is threaded onto the upper end of the casing 10. The cap 21 has an inner wall or partition 22 having a bearing surface 23 therein for the spindle 13. A knurled nut 24 is threaded onto the end of the spindle 13 and may be retained by a lock nut 25. The bearing cap 21 may be retained on the casing 10 by a tap screw 26.

As shown in Figs. 1 and 2, a ratchet-toothed wheel 27, which is threaded onto the spindle 13, and a spiral spring 28, which surrounds the ratchet wheel 27 are disposed in the bearing cap 21 between the wall 22 and the nut 24. One end of the sprial spring 28 is disposed in a groove 29 in the inner surface of the bearing cap 21. The other end of the spring 28 engages the teeth on the ratchet wheel 27. Thus, the spring and ratchet may be utilized to restrain the helical spring 12 in a wound condition until the chuck 16 and the tube 11 are released, as will be explained more fully hereinafter.

In order that the speed of rotation of the cutting tool 15 may be readily controlled, the outside diameter of the tube 11 is slightly less than the inside diameter of the casing 10 and the wall of the casing is relatively thin throughout most of its length. Thus, the speed of the rotating tool may be controlled by changes in pressure between the operator's thumb and fingers while holding the instrument in much the same manner as a pencil is normally held. The thickness of the wall of the outer casing or tube 10 is such that it can be easily depressed inward against the inner tube 11, thereby acting as a brake.

With a view toward preventing sudden accelerations and decelerations of the tube 11 when changes in pressure are made on the outer tube 10, a substantially constant viscosity grease is interposed between the tubes 10 and 11 throughout the length of the thin wall of the tube 10. The viscous material acts as a drag and thus limits the rate of rotation of the chuck 16 when pressure is removed or reapplied on the tube 10.

In this manner it is possible to so release the pressure on the outer tube that the cutter makes a partial revolution slowly or continues to spin for many revolutions.

When using the instrument, the left hand thumb and index finger of the operator are placed between the chuck 16 and the outer tube or casing 10 so as to prevent relative rotation as the spring 12 is wound. The spring 12 may be wound by turning the knurled nut 24 in a right-handed direction.

Thus, as the nut 24 is turned, in the same way as a watch is wound, the tube 11 tends to turn in the same direction as the nut 24, but is restrained at the chuck 16. The ratchet wheel 27 and spring 28 prevent the spring 12 from unwinding when the nut 24 is released.

When the spring 12 is fully wound, the operator's right hand grasps the casing 10 with the thumb and fingers as though the instrument were a pencil. Moderate pressure is now exerted between the thumb and fingers and the left hand removed from holding the chuck. The chuck, with the cutting tool in place, will not rotate until the pressure on the casing 10 is reduced or released, depending upon the speed desired. Once this is done, the rotation may be stopped by again applying pressure.

From the foregoing description, it is apparent that I have provided a surgical instrument which is convenient to use, since it may be held in the operable position much the same as a pencil is held, the speed of the cutting tool being controlled by changes in pressure between the operator's thumb and fingers holding the instrument.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A surgical instrument comprising a cylindrical casing, a cylindrical tube rotatably disposed in said casing, a cutting tool driven by said tube, a helical spring for storing energy to rotate said tube, and means disposed at one end of the casing for winding the spring, the wall of said casing being depressible to frictionally engage said tube to control its rate of rotation.

2. A surgical instrument comprising a cylindrical casing, a cylindrical tube rotatably disposed in said casing, a cutting tool driven by said tube, a spring for storing energy to rotate said tube, and means disposed at one end of the casing for winding the spring, said casing having a relatively thin wall which is depressible to engage said tube to control its rate of rotation.

3. A surgical instrument comprising a cylindrical casing, a cylindrical tube rotatably disposed in said casing, the outside diameter of said tube being slightly less than the inside diameter of said casing, a cutting tool driven by said tube, and a helical spring disposed inside of the tube for storing energy to rotate the tube, the wall of said casing being depressible to frictionally engage said tube to control its rate of rotation.

4. A surgical instrument comprising a cylindrical casing, a cylindrical tube rotatably disposed in said casing, the outside diameter of said tube being slightly less than the inside diameter of said casing, a cutting tool driven by said tube, and a helical spring disposed inside of the tube for storing energy to rotate the tube, said casing having a relatively thin wall which is manually depressible to engage said tube to control its rate of rotation.

5. A surgical instrument comprising a cylindrical tube rotatably disposed in said casing, the outside diameter of said tube slightly less than the inside diameter of said casing, a cutting tool driven by said tube, and a helical spring disposed inside of the tube for storing energy to rotate the tube, said casing having a relatively thin wall which is manually depressible to engage said tube to control its rate of rotation, and a viscous material disposed between said casing and said tube.

6. A surgical instrument comprising an inner and an outer tube, said inner tube being rotatably mounted in the outer tube, the outside diameter of the inner tube being slightly less than the inside diameter of the outer tube, a cutting tool driven by said inner tube, and a spring disposed inside of the inner tube for storing energy to rotate the inner tube, said outer tube being manually depressible to engage the inner tube to control its rate of rotation.

7. A surgical instrument comprising an inner and an outer tube, said inner tube being rotatably mounted in the outer tube, the outside diameter of the inner tube being slightly less than the inside diameter of the outer tube, a cutting tool driven by said inner tube, a spring disposed inside of the inner tube for storing energy to rotate the inner tube, said outer tube being manually depressible to engage the inner tube to control its rate of rotation, and a material having a substantially constant viscosity disposed between said inner and outer tubes.

CHARLES C. WHITTAKER.

REFERENCES CITED

The following references are of record in the file of this patent:

UNITED STATES PATENTS

| Number | Name | Date |
|---|---|---|
| 1,905,851 | Green | Apr. 25, 1933 |